United States Patent Office 3,347,835
Patented Oct. 17, 1967

3,347,835
PROCESS FOR THE CHLOROSULFONATION OF POLYETHYLENE
John Clark Lorenz, Hockessin, Del., assignor to E. I. du Pont de Nemours and Company, Wilmington, Del., a corporation of Delaware
No Drawing. Filed Nov. 20, 1964, Ser. No. 412,842
6 Claims. (Cl. 260—79.3)

ABSTRACT OF THE DISCLOSURE

Cholorsulfonation of a polyethylene, which is solid at 70° C., by forming a homogeneous mass of 100 parts of the polyethylene and at least 25 parts of sulfuryl chloride adding a free-radical catalyst whose activation temperature is above 50° C. (preferably at least 70° C.), and initiating chlorosulfonation by generating free radicals within the mass.

---

This invention relates to cholorsulfonation of polyolefins and, more particularly, to a novel process for chlorosulfonating solid polyolefins with sulfuryl chloride to produce homogeneously chlorosulfonated polymers.

Chlorosulfonated polyolefins, for example chlorosulfonated polyethylenes, having rubber-like properties after vulcanization, are produced by chlorosulfonating solutions of the polyolefin in solvents, such as carbon tetrachloride or tetrachloroethylene, with mixtures of gaseous chlorine and sulfur dioxide, or sulfuryl chloride. This solution chlorosulfonation produces a uniform distribution of chlorine and sulfur in the polymer, and the product is termed "homogeneously" chlorosulfonated. Homogeneous chlorosulfonation is essential to obtain the desired rubber-like (or elastomeric) properties after vulcanization. Unfortunately, when homogeneous chlorosulfonation is achieved via the solution process, large amounts of solvents must be recovered and reworked, greatly adding to the cost of the product.

It is known to chlorosulfonate solid polyethylene with mixtures of chlorine and sulfur dioxide or with gaseous sulfuryl chloride while the polyethylene is in the form of finely divided powder or in finely divided particles suspended in an inert liquid medium. In these products, however, the distribution of chlorine and sulfonyl chloride groups is such that the polyethylene is "heterogeneously" chlorosulfonated, part being very highly chlorosulfonated or not chlorosulfonated, and the properties after vulcanization are not like those obtained from chlorosulfonated polyethylene produced in the "homogeneous" chlorosulfonation process.

It has unexpectedly been found that homogeneously chlorosulfonated polyolefins can be obtained by forming a homogeneous mass of the polyolefin and sulfuryl chloride and initiating chlorosulfonation by generating free radicals within the mass.

The following symbolic flow diagram illustrates a specific embodiment of the invention:

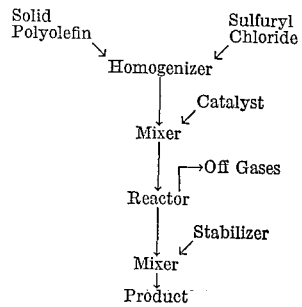

Any polyolefin which is solid at about 70° C. and is capable of chlorosulfonation is suitable for the process of this invention. Thus, for example, copolymers of ethylene and propylene, as well as a wide variety of polyethylenes may be used. Especially preferred are polyethylenes whose melt index is below 200. There is no limitation on the type of polyethylene which may be used in the process of the invention; i.e., it may be made by any of the well-known processes of the art such as "high pressure" polymerization or the so-called "coordination" polymerization.

The following table shows an approximate relationship between melt index number and weight-average molecular weight, for polyethylenes polymerized with a coordination catalyst system which are in the preferred range for use in the novel process.

| Melt Index: a | Molecular weight b (weight average) |
|---|---|
| 0.015 | 500,000 |
| 0.5 | 130,000 |
| 1 | 105,000 |
| 5 | 65,000 |
| 20 | 41,000 |
| 200 | 20,000 | a Determined according to ASTM–D–1238–52T.
b Determined by light scattering method.

It is especially noteworthy that high-density (above about 0.93) polyethylenes with melt indices below 10 and even as low as 0.015 can be chlorosulfonated homogeneously by the process of this invention, because these types are sometimes difficult to chlorosulfonate homogeneously under economically attractive conditions even in solvents such as carbon tetrachloride.

A homogeneous mass of the polyolefin and sulfuryl chloride is essential to the process and can be prepared in various ways, for example, by mixing in blending devices, kneading devices, extruders, tumbling devices, etc. It is convenient to mix solid particles about ⅓₂ in. diameter of the polyolefin with liquid sulfuryl chloride by tumbling or other mechanical means until the particles uniformly absorb the sufuryl chloride. It is also convenient to mix the massed polyolefin with sulfuryl chloride under reasonably anhydrous conditions in an extruder or kneading machine until a homogeneous plastic mass is achieved. In this procedure, it may be desirable to perform the mixing at an elevated temperature such as 150° C. so the mixture can "homogenize" easier.

From the above it is to be noted that the particle size of the polyolefin material is not critical, so long as homogeneity of the polyolefin and sulfuryl chloride is achieved.

The ratio of sulfuryl chloride to polyolefin depends primarily on the degree of chlorosulfonation desired with an excess above theoretical being preferred because the precise degree of chlorosulfonation is controlled by the reaction conditions. Thus, there is no restriction on the maximum amount of sulfuryl chloride which may be used to prepare a homogeneous mixture with the polyolefin, but a weight ratio of 4:1 is about maximum for an economical process. The minimum weight ratio of sulfuryl chloride to polyolefin which will provide a vulcanizable product with elastomeric properties, is about 0.25 to 1. In practice, it is preferred to have the weight ratio of sulfuryl chloride to polyolefin in the range of 1:1 to 3:1.

It is an essential part of this invention that the homogeneous combination of the solid polyolefin and sulfuryl chloride is achieved before the occurrence of chlorosulfonation. This can be readily accomplished by withholding the generation of free radicals until the homogeneous starting mixture is prepared.

The following representative free-radical catalysts are useful for promoting the chlorosulfonation reactions in the homogeneous mixture of solid polyolefin and sulfuryl chloride used in the process of this invention: azobis-(cyanoalkanes) such as azobisisobutyronitrile, azodicyclohexanecarbonitrile, 2 - (2' - hydroxyethylazo) - 2,4-dimethylvaleronitrile; organic peroxides such as, lauroyl peroxide or di-tert-butyl peroxide. Especially preferred is azobisisobutyronitrile. The reaction may also be promoted by irradiation with actinic light, or by X-radiation. It is also possible to generate free radicals by heating the mixture to a temperature at which free radicals are formed from the reactants themselves. Combinations of the various free-radical sources may also be used.

In using the azo catalysts, the concentration used is between 0.05 and 1% based on the polyolefin and the range between 0.1 and 0.5% is preferred. In selecting the catalysts for use in the present invention it is preferable to consider those with an activation temperature above 50° C., preferably at least 70° C. so that they may be incorporated, if desired, with the polyolefin/sulfuryl chloride mixture below these temperatures without promoting chlorosulfonation prematurely.

If desired, reaction inhibitors may be used in the homogenization step to delay premature chlorosulfonation even at relatively high temperatures such as 150° C. Representative inhibitors are hindered phenolic compounds such as 2,6-di-t-butyl-4-methyl phenol, 4,4'-methylene-bis-(2,6-di-t-butyl phenol), alkali metal nitrites, and iodine. A preferred inhibitor is 2,6-di-t-butyl-4-methyl phenol. When an inhibitor is used, the preferred amount is from 0.02% to 0.1% based on the polyolefin. In most cases, it will be desirable to generate additional free radicals to overcome the effect of the inhibitor. This may be done by heating or by increasing the amount of free-radical catalyst.

The chlorosulfonation of polyolefins by the process of this invention is performed batchwise or continuously. In batchwise operation it is preferred to mix finely divided particles of polyolefin and sulfuryl chloride at room temperature until a uniform distribution of the two materials is attained, then the reaction catalyst is introduced, blended uniformly with the polyolefin mixture, and the mass is introduced into a glass-lined pressure vessel. The final homogenization and the chlorosulfonation reaction are produced by gradually warming the vessel and contents above 50° C. generally to about 100° C. When the exothermic chlorosulfonation reaction begins, the reaction mixture is held at about 100° C. to 140° C. for about 20 minutes, and then cooled to about 70° C. to 100° C. The off-gases are vented, the vessel and contents are cooled, and degassed under vacuum at about 50° C. The isolated chlorosulfonated polyolefin is preferably stabilized to provide long-term storage life. Stabilization is achieved by milling the chlorosulfonated polyolefin with about 2% by weight of a suitable stabilizer such as the condensation product of two moles of epichlorohydrin with one mole of propane-2,2-bisphenol. A suggested process for the continuous chlorosulfonation of polyolefins by the process of this invention is illustrated in the symbolic diagram set forth above.

In this embodiment, the solid polyolefin and sulfuryl chloride are continuously introduced into a mixing device such as an extruder, maintained at a temperature sufficient to produce a homogeneous plastic mass which is fed into a mixer equipped with cooling and heating means at a temperature adequate to keep the homogeneous mass plastic enough for a catalyst to be introduced uniformly below the initiation temperature. The mass, ready for reaction, is fed to a pressure reactor capable of withstanding a pressure of 50 atmospheres, equipped with heating and cooling means and reaction is started by warming above the initiation temperature. The exothermic reaction is controlled by cooling so the reaction proceeds between the initiation temperature for the catalyst and the decomposition temperature of the particular chlorosulfonated polyolefin being prepared. As the reaction proceeds, the off-gases are removed by venting, and finally by degassing. The product now proceeds in a plastic state to another mixer such as an extruder maintained at a temperature adequate to keep the chlorosulfonated mass plastic enough for a stabilizer to be introduced uniformly. The mass is discharged as a stable, vulcanizable chlorosulfonated polyolefin.

The process of this invention produces homogeneously chlorosulfonated polyolefins without the need for dissolving the polyolefin in solvents. Under some conditions in operating the process of the invention, liquid diluents may be used to assist in regulating the rate of reaction, for example as a heat absorber. It is important that these diluents be inert, i.e., non-reactive at process conditions with the sulfuryl chloride or the polyolefins. Such diluents are those in which the polyolefin and the chlorosulfonated product are substantially immiscible. The concentration of liquid diluent which may be used is not critical but a weight ratio of diluent to sulfuryl chloride of less than 3:1 is preferred. Representative of the inert diluents which may be used are trichlorofluoromethane, dichlorodifluoromethane, chlorodifluoromethane, trichlorotrifluoroethane, dichlorohexafluorocyclobutane, octafluorocyclobutane.

The invention will now be described with reference to the following examples of specific embodiments thereof wherein parts and percentages are by weight unless otherwise specified.

EXAMPLES I TO VII

The following examples are performed in accordance with the following general procedure with the variations as set forth in Table I below:

Powdered polyethylene of melt index 4, density 0.96 is screened through a 40 mesh (U.S. Standard) screen. One gram of the powder passing the 40 mesh screen is blended at room temperature with 2.4 grams of sulfuryl chloride, containing azobisisobutyronitrile catalyst as shown below, to form a free-flowing "dry-blend" mixture. The mixture is sealed in a 10 ml. heavy-wall glass tube and immersed in an oil bath for 10 minutes at the temperatures shown below. The tube is cooled to room temperature, opened, and the product is removed and degassed under vacuum at 40° C. for about 16 hours. The product is milled for about 2 to 5 minutes on a 2-roll rubber mill at about 30° C., and analyzed for chlorine and sulfur.

The following data are representative:

TABLE I

| Example | Temperature of Bath (° C.) | Catalyst (mg.) | Product, percent | |
|---------|---------------------------|----------------|------|-----|
|         |                           |                | Cl   | S   |
| I       | 80                        | 5              | 14.0 | 2.0 |
| II      | 85                        | 5              | 39.9 | 3.0 |
| III     | 90                        | 5              | 35.0 | 0.8 |
| IV      | 90                        | 1              | 30.5 | 0.4 |
| V       | 90                        | 0.5            | 16.7 | 0.5 |
| VI      | 100                       | 0.5            | 23.4 | 0.5 |
| VII     | 110                       | 0.5            | 34.9 | 0.2 |

EXAMPLE VIII

A mixture of one gram of the powdered polyethylene of Example I, 2.4 grams of sulfuryl chloride, 5 grams of trichloro trifluoroethane diluent, and 5 milligrams of azobisisobutyronitrile catalyst is sealed at room temperature in a 10 ml. heavy-wall glass tube and heated slowly to 120° C. over a period of 50 minutes. The tube is cooled to room temperature, opened, and the product is dried in air, followed by mixing for about 3 minutes on a 2-roll rubber mill at about 30° C. The chlorosulfonated product typically contains about 33.2% chlorine and 0.8% sulfur.

The product is compounded on a 2-roll rubber mill according to the following weight proportions:

| | |
|---|---|
| Polymer | 100 |
| Semi-reinforcing furnace black | 40 |
| Litharge | 25 |
| Dipentamethylene thiuram tetrasulfide | 2 |
| Mercaptobenzothiazole | 0.5 |

The compounded polymer is press cured 30 minutes at 153° C., cooled to 25° C. and the following typical stress-strain properties are obtained: tensile strength at break 3900 p.s.i.; elongation at break 260%.

EXAMPLE IX

One gram of a powdered polyethylene, melt index 0.015, density 0.94, and 5 grams of sulfuryl chloride are mixed together at room temperature and sealed in a 10 ml. heavy-wall glass tube. The tube and contents are heated to about 95° C. during about 15 minutes. As this temperature is reached, the polyethylene imbibes the sulfuryl chloride to form a homogeneous mass. Heating is continued. At about 100° C. an exothermic chlorosulfonation reaction begins which attains a maximum temperature of 133° C. The tube is cooled, opened, the product is dissolved in benzene, precipitated with methanol, dried in air and analyzed. The product typically contains about 53.6% chlorine and 0.1% sulfur.

EXAMPLE X

One gram of the powdered polyethylene of Example I is mixed with 0.25 gram of sulfuryl chloride, 10 mg. of azobisisobutyronitrile, and 5 grams of trichlorotrifluoromethane diluent, and sealed in a 10 ml. heavy-wall glass tube. The tube and contents are immersed in a water bath at 100° C. for 30 minutes, removed, cooled, and opened. The dry product typically contains about 5.7% chlorine and 0.1% sulfur.

EXAMPLE XI

Polyethylene powder of melt index 10, density 0.92 prepared by high pressure polymerization, is screened as described in Example I. One gram of the polyethylene is mixed with 2 grams of sulfuryl chloride and 5.0 mg. of azobisisobutyronitrile catalyst and sealed in a 10 ml. heavy-wall glass tube. The tube and contents are immersed in a 70° C. bath and heated to 90° C. over a period of 16 minutes. The tube and contents are cooled, opened and the product is dried overnight in a 50° C. vacuum oven. The product typically contains about 20.9% chlorine and 5.6% sulfur.

EXAMPLE XII

One gram of the powdered polyethylene of Example I, 2.4 grams of sulfuryl chloride, 5 grams of trichlorotrifluoroethane diluent and 10 mg. of benzoyl peroxide catalyst are mixed together at room temperature and sealed in a 10 ml. heavy-wall glass tube. The tube and contents are heated to about 90 to 95° C. where the polyethylene imbibes the sulfuryl chloride to form a homogeneous mass. Heating is continued, and at about 97° C. an exothermic chlorosulfonation reaction begins. The tube is cooled, opened, the product dried in air, and blended on a 2-roll rubber mill. The product typically contains about 34.5% chlorine and 0.1% sulfur.

EXAMPLE XIII

Example XII is repeated except lauroyl peroxide catalyst is substituted for benzoyl peroxide. The product typically contains about 34% chlorine and 0.2% sulfur.

EXAMPLE XIV

A mixture of one gram of a non-crystalline ethylene-propylene copolymer containing 56% propylene, 1 gram of sulfuryl chloride, and 5 grams of trichlorotrifluoroethane diluent is sealed in a 10 ml. heavy-wall glass tube. The copolymer rapidly forms a homogeneous mass. The tube and contents are exposed to radiation from a standard "RS" sunlamp for 14 minutes, during which time, the temperature increases to about 55° C. and chlorosulfonation occurs. The tube is cooled, opened, the contents removed, dried and blended on a 2-roll rubber mill. The product typically contains about 11.6% chlorine and 0.5% sulfur.

EXAMPLE XV

Five grams of the polyethylene powder of Example I is "dry blended" at room temperature with 12 grams of sulfuryl chloride and 10 mg. of azodicyclohexanecarbonitrile catalyst, and sealed in a nickel bomb with a pressure relief set at 600 p.s.i.g. The vessel and contents are immersed in a 130° C. bath. During a period of 12 minutes, the internal temperature of the bomb reaches about 125° C. and remains there for 8 additional minutes, after which the bomb and contents are removed from the bath, the gases are vented to atmospheric pressure, and the bomb is cooled to room temperature. The contents are degassed and dried for 12 hours in a vacuum oven at 50° C. The product typically contains about 32% chlorine and 1.1% sulfur.

The product is compounded on a 2-roll rubber mill according to the following weight proportions:

| | |
|---|---|
| Polymer 100 | 100 |
| Semi-reinforcing carbon black | 40 |
| Litharge | 25 |
| Dipentamethylene thiuram tetrasulfide | 2 |
| Mercaptobenzothiazole | 0.5 |

The compounded polymer is cured for 30 minutes at 153° C., cooled to 25° C. and tested for stress-strain properties. The tensile strength at break is 3250 p.s.i. and the elongation at break is 180%.

EXAMPLE XVI

Polyethylene of Example I is fed to the screw of an extruder at a rate of 60 gm. per minute, then melted by passing into a zone maintained at a temperature of 150° C. Sulfuryl chloride, containing 1.33 grams per liter of 2,6-di-t-butyl-4-methyl phenol inhibitor, is injected at the rate of 75 gm. per minute and mixed into the melt. At a second injection point a solution of 13 grams of 1,1-azodicyclohexane carbonitrile catalyst in 250 ml. of sulfuryl chloride is introduced at a rate of 18 gm. per minute. A reaction occurs which raises the temperature of the mass to about 170° C. just beyond the injection point. The reaction is continued through a further length of extruder which allows an average residence time of about 2 minutes, and the mass is passed into a zone of reduced pressure where gaseous materials are separated. The polymeric product typically contains 23.2% chlorine and 0.4% sulfur, and is comparable in properties to material produced by conventional solution processes.

The homogeneously chlorosulfonated polyolefins prepared by the process of this invention have the same uses as the homogeneously chlorosulfonated polyolefins prepared by prior art processes. For example, chlorosulfonated polyethylene prepared by the new process is vulcanizable according to the well-known techniques of the compounding art. The vulcanizates of the chlorosulfonated polyethylenes prepared by the process of the invention exhibit no inferior physical properties when compared to the homogeneously chlorosulfonated polyethylenes made by the solution process.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for chlorosulfonating polyolefins which are solid at 70° C. which comprises (a) forming a homogeneous mass consisting essentially of the polyolefin and sulfuryl chloride in a weight ratio of at least 25 parts of sulfuryl chloride per 100 parts of polyolefin, (b) thereafter adding a free-radical generating catalyst, and (c) initiating chlorosulfonation by generating free radicals within the mass.

2. A process for chlorosulfonating polyethylene which is solid at 70° C. and has a melt index below about 200 which comprises (a) forming a homogeneous mass consisting essentially of the polyethylene and sulfuryl chloride in a weight ratio of sulfuryl chloride to polyethylene ranging from about 1:1 to 3:1, (b) thereafter adding a free-radical generating catalyst, and (c) initiating chlorosulfonation by generating free radicals within the mass.

3. A process as defined in claim 2 wherein a free radical-generating catalyst is present in amounts ranging from about 0.05 to 1 percent based on the weight of polyethylene, said catalyst having an activation temperature above about 50° C.

4. A process as defined in claim 2 wherein an inert liquid diluent is present which is substantially immiscible with the polyethylene and the chlorosulfonated product, the weight ratio of said diluent to sulfuryl chloride being less than about 3:1.

5. A process for chlorosulfonating a high-density polyethylene, having a melt index between 0.015 and 10, in the presence of about 0.05 to 1 percent, based on the weight of polyethylene, of a free radical-generating catalyst having an activation temperature above about 70° C., which process comprises (a) forming a homogeneous mass consisting essentially of the polyethylene and sulfuryl chloride in a weight ratio of sulfuryl chloride to polyethylene ranging from about 1:1 to 3:1, (b) thereafter adding said catalyst, and (c) initiating chlorosulfonation by generating free radicals within the mass.

6. A continuous process for chlorosulfonating a high-density polyethylene, having a melt index between 0.015 and 10, which comprises (1) melting said polyethylene and mixing with sulfuryl chloride in a first zone in the presence of about 0.02 to 0.1 percent of an inhibitor based on the weight of polyethylene, the weight ratio of sulfuryl chloride to polyethylene ranging from about 1:1 to 3:1, (2) passing the mixture to a second zone where about 0.05 to 1 percent, based on the weight of polyethylene, of a free-radical generating catalyst having an activation temperature of at least 70° C. is added to the mixture; (3) passing the mixture through a reaction zone where chlorosulfonation is initiated by generating free radicals within the mass.

References Cited
UNITED STATES PATENTS
2,405,971   8/1946   McAlevy _____ 260—79.3

JOSEPH L. SCHOFER, *Primary Examiner.*

D. K. DENENBERG, *Assistant Examiner.*